United States Patent [19]
Inaba

[11] Patent Number: 5,518,869
[45] Date of Patent: May 21, 1996

[54] PHOTOGRAPHIC FILM

[76] Inventor: Minoru Inaba, No. 1116 Oaza Samukawa, Oyama-shi, Tochigi-ken, Japan

[21] Appl. No.: 413,414

[22] Filed: Mar. 30, 1995

[51] Int. Cl.⁶ .............................. G03C 1/00; G03C 3/02; G03C 1/76
[52] U.S. Cl. ..................... 430/496; 430/501; 352/241
[58] Field of Search ........................ 352/241; 354/354; 353/120; 430/501, 496

[56] References Cited

U.S. PATENT DOCUMENTS

| | | | |
|---|---|---|---|
| 2,527,765 | 10/1950 | Roehrl | 40/159.2 |
| 4,295,713 | 10/1981 | Edwards | 352/241 |
| 4,340,663 | 7/1982 | Mikawa et al. | 430/496 |
| 5,338,650 | 8/1994 | Iwagaki | 430/496 |

FOREIGN PATENT DOCUMENTS

| | | | |
|---|---|---|---|
| 423398 | 4/1911 | France | 352/241 |
| 1134573 | 4/1957 | France | 352/241 |

*Primary Examiner*—Russell E. Adams
*Assistant Examiner*—Matthew Miller
*Attorney, Agent, or Firm*—Fattibene and Fattibene; Paul A. Fattibene; Arthur T. Fattibene

[57] ABSTRACT

The present invention is to improve the visibility of a cutting position of a developed reversal film, and in the invention perforations are provided in upper and lower sides of a photographic film at the same pitch as that of the photographic area of a camera. A V-shaped groove is provided in the perforation at a longitudinally central position. The V-shaped grooves in the upper and lower perforations serve as an accurate target for cutting by taking photos with a camera designed such that the perforations are situated at gap portions G between photographic areas or frames.

3 Claims, 8 Drawing Sheets

PHOTOGRAPHIC FILM

FIELD OF THE INVENTION

The present invention relates to a photographic film, and more particularly to a perforated roll film.

BACKGROUND OF THE INVENTION

In a conventional perforated photographic film such as a 35 mm photographic film, perforations are provided at regular intervals in the vicinity of side edge portions of the film. For instance, in the 35 mm. film, the pitch of perforations is about 4,735 mm. Perforations are originally provided in a movie film with a view to transporting the film by bringing a sprocket of a movie projector into mesh engagement with them.

In addition, in a still camera, a sprocket is brought into mesh engagement with perforations so as to detect a film transporting amount to thereby control the film transporting amount for each frame, but in a reversal film, since the edge portion of a picture taken, for instance, with a dark background and a gap between pictures equally become dark when developed, when trying to sever the developed reversal film into frames, it is not easy to locate a boundary between the edge portion of the picture and a gap between pictures and a one adjacent to it. Moreover, since a gap is set to be located substantially at an intermediate position between perforations aligned at a small pitch in a direction in which a perforated roll film is transported, there is provided no target indicating a severing position, causing a risk of making a mistake in recognizing a severing position when trying to sever the film to thereby damage a picture. Thus, there is problem in which proper care should be exercised in handling the film.

Then, in order to facilitate the recognition of severing positions to thereby improve the handling properties of a developed film when trying to sever it into frames, the applicant of the present invention has proposed a photographic roll film in which a perforation is disposed at a gap portion between photographic areas or frames of the film, as well as a photographic film in which the perforation so disposed are formed into an oval which is made elongate in a direction in which the film is transported. In this photographic film, the pitch of the perforations so provided is set equal to that of a photographic area of a camera so that they serve as a target indicating a severing position of the photographic film when it is used in a camera in which its film transporting mechanism is designed so as to match the perforations which are situated at a gap portion between photographic areas or frames.

In addition, the applicant of the present invention purposes a slide mount desirable for mounting a photographic film configured as described above. In this slide mount, positioning pins are provided at four corners of a film table portion of a mount frame in such a manner as to upwardly protrude therefrom. The positioning pins are formed so as to have such an outside diameter that the perforations can be brought into engagement with them, and the vertical and longitudinal pitches are made equal to those of the perforations of the afore-mentioned photographic film. Therefore, when the photographic film severed into a frame is placed on the film table portion and then a film presser cover is fittingly mounted on the mount frame, the perforations at the four corners of the severed photographic film are brought into engagement with the positioning pins, the photographic film being thereby accurately positioned for mounting.

The risk of making a mistake in locating a cutting position when trying to sever a photographic film into frames can almost be eliminated by disposing perforations at gaps between photographic areas or frames of the film. In a case, however, where the width of the gap between photographic areas or frames is made as small as possible to reduce the loss of a photographic film, and if a cutting position is determined within the range of the longitudinal length of the perforation, a risk of cutting the film at the edge portion of a picture will arise. Thus, if a more accurate target is available as a cutting position, the handling of a film in cutting it will be easier.

Thus, there will arise a technical issue to be solved in order to facilitate the film cutting operation by accurately cutting a film at the longitudinally central position of the perforation, and an object of the present invention is to solve this issue.

SUMMARY OF THE INVENTION

This invention was made to achieve the above object and provides a photographic roll film wherein perforations are formed at regular intervals in a longitudinal direction in the vicinity of edge portions of upper and lower sides of the photographic roll film in such a manner that they are parallel to and vertically symmetrical with each other and wherein the perforations are disposed at gaps between photographic areas or frames of the film, the photographic roll film being characterized in that the perforation is oval and is elongated in a direction in which the film is transported and that a V-shaped groove is formed in upper and lower sides of the perforation at longitudinally central positions thereof. The photographic roll film is further characterized in that the perforation is in the form of an eccentric double circle which is displaced in the film transporting direction and which comprises a pair of circular holes which are partially superposed on each other. The photographic roll film is also characterized in that the perforation is in the forms of an eccentric double circle which is displaced in the film transporting direction and which comprises a pair of circular holes which are partially superposed on each other and that a V-shaped groove is formed in upper and lower sides of the eccentric double circle at longitudinally central positions thereof.

In the photographic roll film of the present invention, a V-shaped groove or a V-shaped raised portion is provided at the longitudinally central position of the upper and lower sides of the perforation which is disposed so as to be positioned at the gap between photographic areas or frames. Consequently, the film can accurately be cut at the center of the gap when it is cut using, respectively, the apexes of the V-shaped grooves or the V-shaped raised portions of the upper and lower perforations as a target for cutting.

In the photographic roll films as set forth in claims 2 and 3, the shape of a perforation of the photographic film cut at the longitudinally central position of the perforation is such that a part of a circle is cut, and the opening of the perforation so cut is smaller than the diameter of the original perforation. Therefore, when the perforations so cut are fitted over the positioning pins on the slide mount proposed by the applicant of this invention, the photographic film is prevented from coming off the positioning pins, thereby facilitating the assembling operation of the slide mount.

Furthermore, in the photographic roll film as set forth in claim 3, when the film is cut at the longitudinally central positions of the perforations, as in the case with the photographic roll film as set forth in claim 2, the shape of the perforations so cut is such that they fit over the positioning pins of the slide mount, and since the opening of the perforations so cut is expanded, the positioning and press fitting of a severed film can be facilitated when trying to press fit the positioning pins into the perforations.

DESCRIPTION OF THE DRAWINGS

FIG. 1 (a) and (b) show an embodiment of an invention as set forth in claim 1, wherein (a) is a front view of the embodied photographic film and (b) an enlarged view of a perforation.

FIG. 4 (a) and (b) show an embodiment of an invention as set forth in claim 2, wherein (a) is a front view of the embodied photographic film and (b) an enlarged view of a perforation.

DESCRIPTION OF PREFERRED EMBODIMENTS

Figure 1:
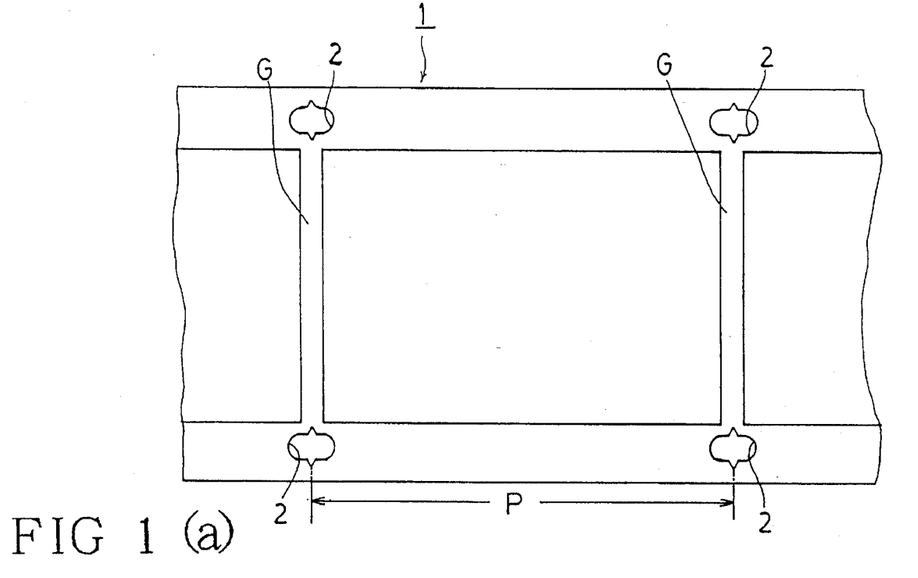

Referring to the accompanying drawings, an embodiment of the present invention will be described in detail below. FIG. 1 shows a photographic film 1 as set forth in claim 1, and perforations 2 are formed in the vicinity of upper and lower edge portions of the photographic film 1 which is, for example, 35 mm wide. A camera using this photographic film 1 is designed such that its exposure position is set, in turn such that its photographic area is situated between left and right perforations as well as upper and lower ones as shown in FIG. 1. and that the pitch of the photographic area becomes identical with that of the perforations 2. By using a camera designed like that the upper and lower perforations 2 can be marks for a cutting line.

In the perforation 2, a V-shaped groove 3 is formed in the upper and lower sides of an oval which is elongated in a direction in which the photographic film 1 is transported so that width of its middle portion is expanded. The diameter D of rounded portions at front and rear ends of the perforation is set so to be equal to that of a positioning pin 7 of a slide mount 4 shown in FIG. 2.

Figure 2:
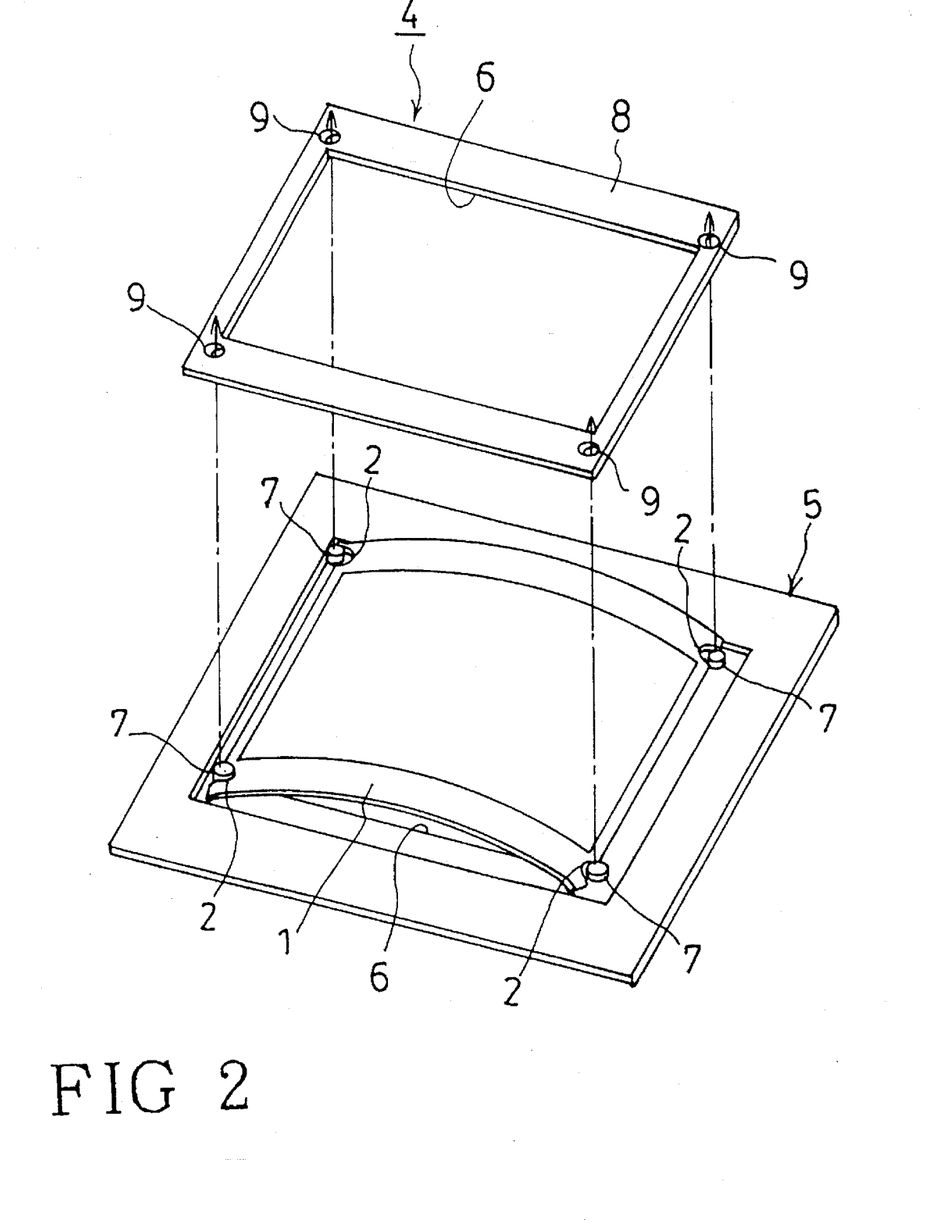
FIG. 2 is an exploded perspective view of a slide mount suitable for the photographic film of the present invention.

A patent application for the slide mount 4 shown in FIG. 2 was filed by the afore-mentioned applicant of the present invention and is still pending (Japanese Patent Publication No. 092635/1994), and in the slide mount, a cylindrical positioning pin 7 is provided at four corners of a window 6 of a mount frame 5 at the same pitch as that of the perforations 2 of the photographic film 1 in such a manner as to erect therefrom, and holes 9 are provided in a film presser cover 8 so that the positioning pins 7 are fitted thereinto, respectively.

With the photographic film 1 shown in FIG. 1, since the apex of the V-shaped groove 3 formed at the longitudinally central position of the perforation 2 is located at the center of a gap portion G between photographic areas or frames, it is possible to accurately cut the photographic film at the center of the gap G between photographic areas or frames by cutting the same with the apexes of the respective V-shaped grooves 3 of the upper and lower perforations used as a target for a cutting position.

When the photographic film 1 severed into frames is mounted on the slide mount 4 as shown in FIG. 2, the perforations 2 of the photographic film so severed are brought into engagement with the positioning pins 7, whereby the position of the photographic film 1 is automatically determined vertically and longitudinally, and thus it is fixed at an accurate position relative to the window 6 of the slide mount 4.

Figure 3:
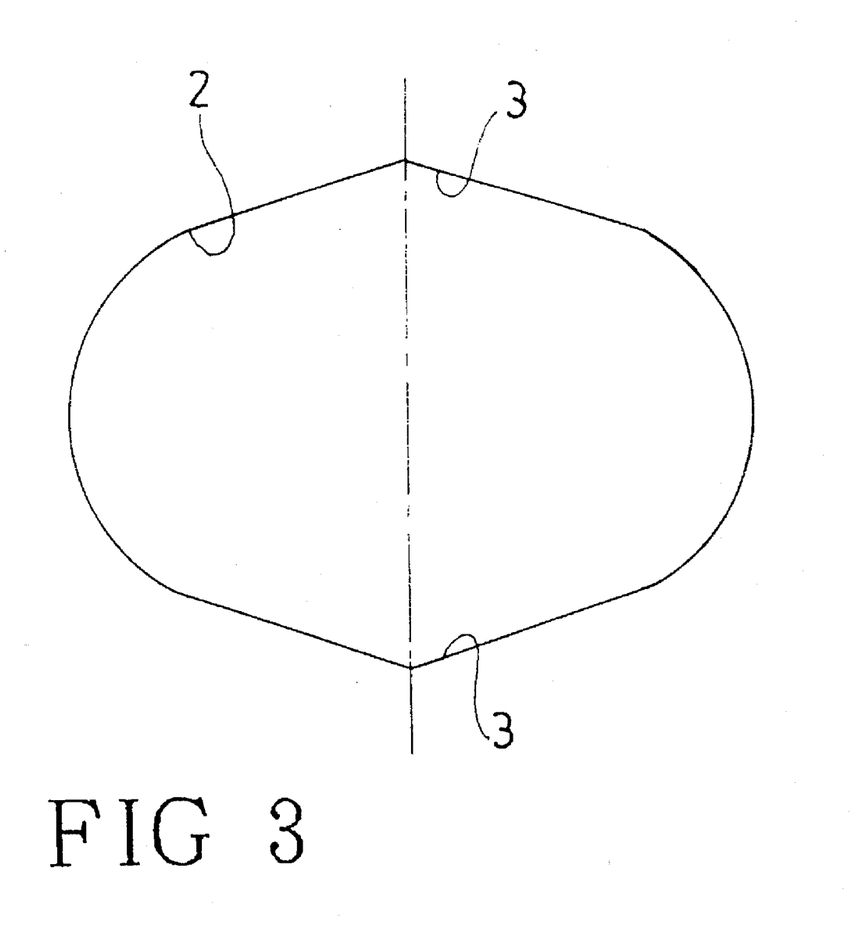
FIG. 3 shows another embodiment of the invention as set forth in claim 1 describing an enlarged view of a perforation.

In addition, the V-shaped groove 3 serving as a target for cutting may be constituted by tangents to the rounded portions at the front and rear ends of the perforation to thereby be formed into a diamond shape as a whole as shown in FIG. 3. Moreover, although not shown, the V-shaped groove 3 may only be provided in either of the upper and lower sides of the perforation 2.

Figure 4:
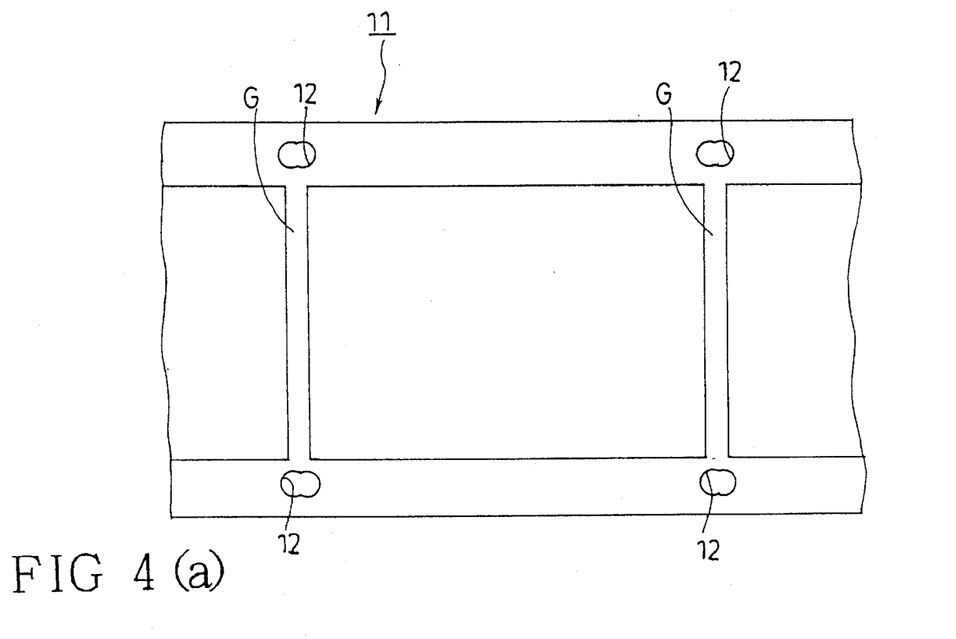
Figure 5:
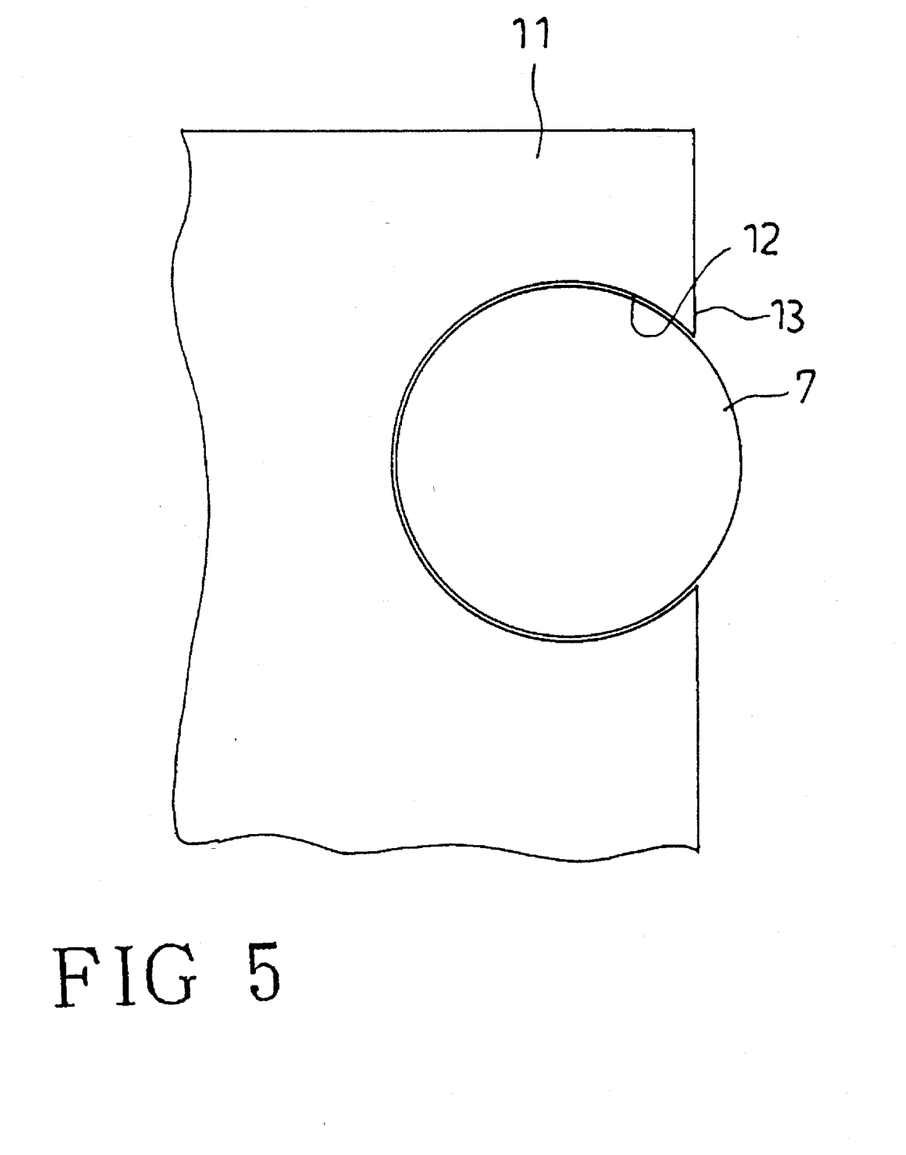
FIG. 5 is a front view of main portion showing a state in which the photographic film shown in FIG. 4 is in engagement with the slide mount shown in FIG. 2.

FIG. 4 shows a photographic film 11 according to claim 2, and in this photographic film 11, a perforation 12 forms an eccentric double circle which is elongated in a direction in which the film is transported and substantially V-shaped raised portion 13 is formed in upper and lower sides of the eccentric double circle at a longitudinally central portion. Thus, the photographic film 11 can also be cut at the center of a gap portion G as in the case with the photographic film 1 as set forth in claim 1 by cutting it along a straight line connecting apexes of the raised portions 13 of the upper and lower perforations 12 to each other which serves as a target. The width of an opening of the perforation 12 of the severed photographic film 11 is smaller than the diameter of the positioning pin 7 of the slide mount 4 shown in FIG. 2, and when a curled photographic film 11 is placed on the slide mount 4 as shown in the same figure and then the upper surface thereof is pressed down, the position pins 7 are, as shown in FIG. 5, press fitted into the perforations 12 for engagement therewith, whereby the photographic film 11 is fixed onto the slide mount 4. Consequently, this makes the subsequent mounting of a film presser cover 8 very easy.

Figure 6:
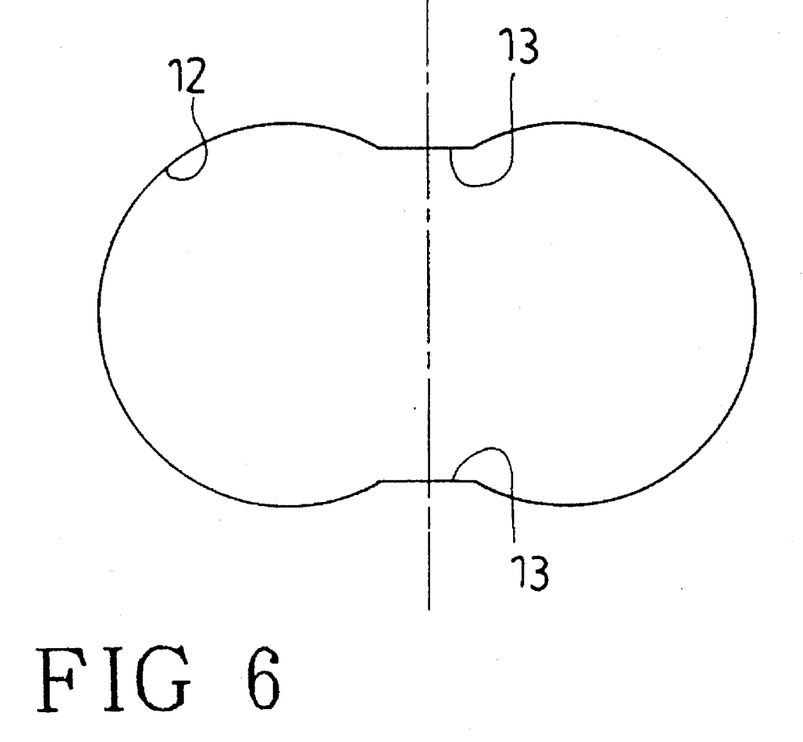
FIG. 6 is an enlarged view of a perforation provided in another embodiment according to the invention as set forth in claim 2, FIG. 7 (a) and (b) show an embodiment of an invention as set forth in claim 3, wherein (a) is a front view of the embodied photographic film and (b) an enlarged view of a perforation

FIG. 6 shows a modified example of the photographic film 11 as claimed in claim 2 wherein the apex of the V-shaped raised portion 13 is flattened, and this example can provide an advantage that there is less possibility that film transporting sprockets of a camera interfere with the raised portions 13 than the case in FIG. 4.

Figure 7:
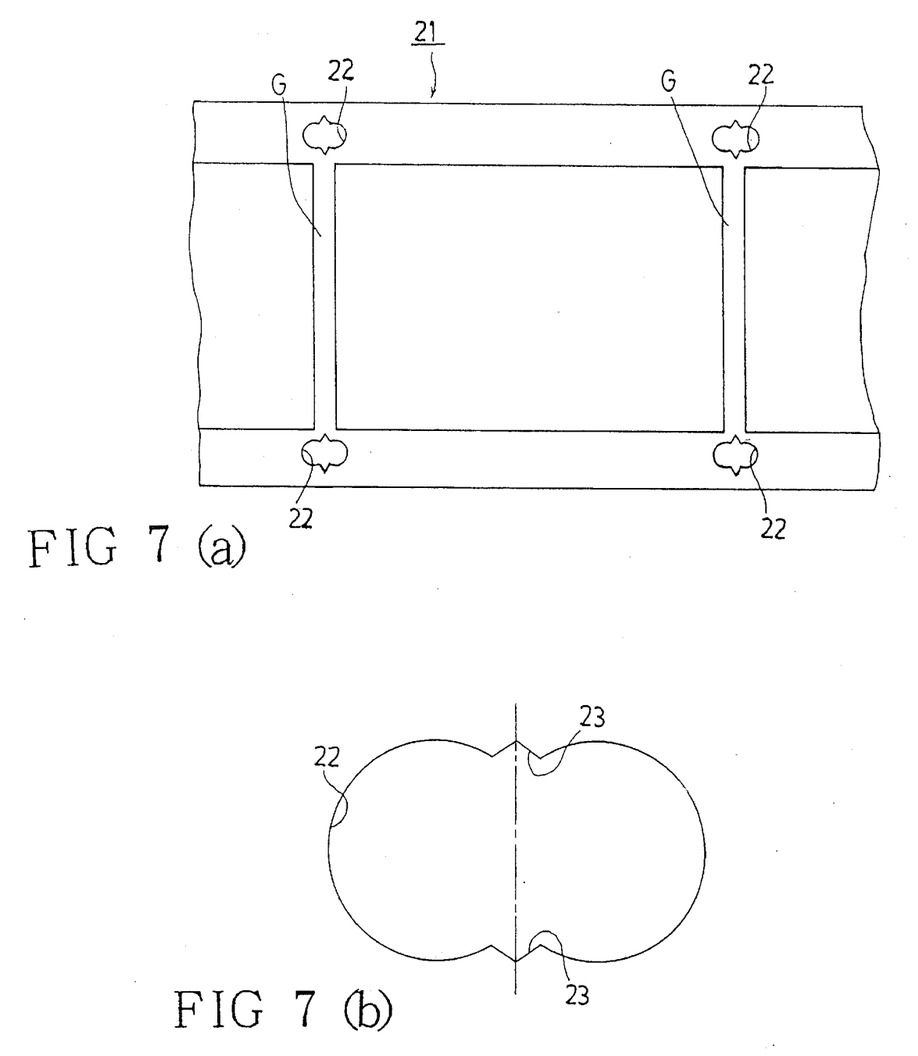

FIG. 7 shows a photographic film 21 according to claim 3, wherein a perforation 22 is a hole comprising an eccentric double circle which is elongated in a direction in which the film is transported and wherein a V-shaped groove 23 is provided in upper and lower sides of the perforation at a longitudinally central portion thereof. The photographic film 21 can also be cut at the center of a gap portion G by cutting it along a straight line connecting apexes of the V-shaped grooves 23 of the upper and lower perforations 22 to each other.

Figure 8:
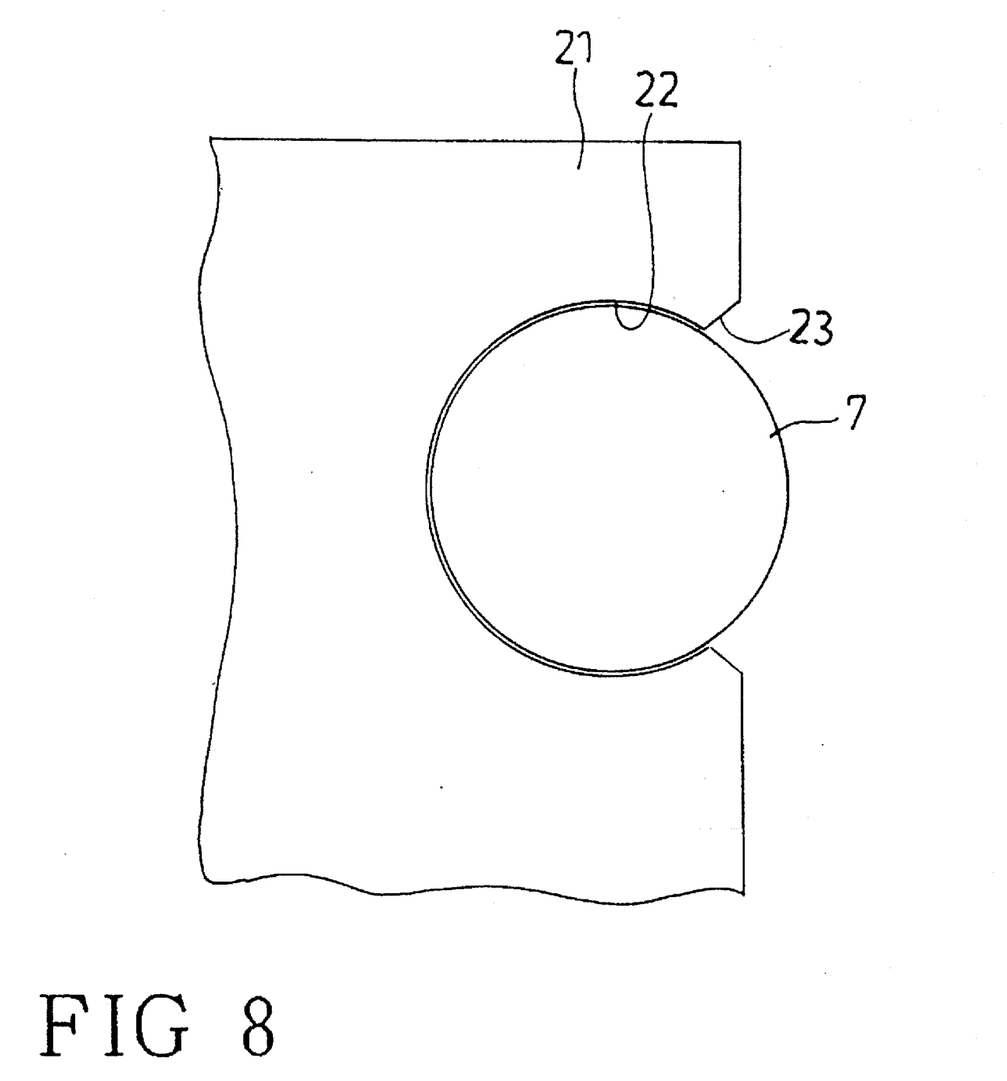
FIG. 8 is a front view of a main portion showing a state in which the photographic film shown in FIG. 7 is in engagement with the slide mount shown in FIG. 2.

An opening of the perforation 22 of the photographic film 22 so severed is expanded, because the photographic film 22 is served at the centers of the V-shaped grooves 23, and as shown in FIG. 8, when the positioning pins 7 of the slide mount 4 are fitted into the perforations 22, the opening functions as an inserting guide and it facilitates the mounting of the photographic film 21.

As is described in detail in the above embodiments, in the present invention, since the V-shaped grooves or V-shaped raised portions provided at the longitudinally central portions of the perforations serve as a target for a cutting position, it is possible to sever the photographic film accurately and easily, thereby improving the handeability properties of the photographic film.

In addition, in the inventions according to claims 2 and 3, since the perforations are formed such that they are brought into engagement with the positioning pins of the slide mount so as to be fixed in place, the workability in mounting the photographic film onto the slide mount is remarkably improved.

Furthermore, in the invention according to claim 3, since the opening of the perforation of the severed photographic film is expanded, the positioning pins can easily be fitted into the perforations, a slide preparing operation being thereby performed more efficiently.

What is claimed is:

1. A photographic roll film wherein perforations are formed at regular intervals in a longitudinal direction in the vicinity of edge portions of upper and lower sides of said photographic roll film in such a manner that they are parallel to and vertically symmetrical with each other and wherein said perforations are disposed at gaps between photographic areas or frames of said film, said photographic roll film being characterized in that said perforation is an oval and is extended in a direction in which said film is transported and that a V-shaped groove is formed in upper and lower sides of said perforation at longitudinally central positions thereof.

2. A photographic roll film wherein perforations are formed at regular intervals in a longitudinal direction in the vicinity of edge portions of upper and lower sides of said photographic roll film in such a manner that they are parallel to and vertically symmetrical with each other and wherein said perforations are disposed at gaps between photographic areas or frames of said film, said photographic roll film being characterized in that said perforation is in the form of an eccentric double circle which is displaced in a direction in which said film is transported and which comprises a pair of circular holes which are partially superposed on each other.

3. A photographic roll film wherein perforations are formed at regular intervals in a longitudinal direction in the vicinity of edge portions of upper and lower sides of said photographic roll film in such a manner that they are parallel to and vertically symmetrical with each other and wherein said perforations are disposed at gaps between photographic areas or frames of said film, said photographic roll film being characterized in that said perforation is in the form of an eccentric double circle which is displaced in a direction in which said film is transported and which comprises a pair of circular holes which are partially superposed on each other and that a V-shaped groove is formed in upper and lower sides of said perforation at longitudinally central positions thereof.

* * * * *